US012352886B2

(12) United States Patent
Patel

(10) Patent No.: US 12,352,886 B2
(45) Date of Patent: Jul. 8, 2025

(54) MODULAR RADAR SYSTEMS

(71) Applicant: GM GLOBAL TECHNOLOGY OPERATIONS LLC, Detroit, MI (US)

(72) Inventor: Vipul M. Patel, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 563 days.

(21) Appl. No.: 17/807,911

(22) Filed: Jun. 21, 2022

(65) Prior Publication Data
US 2023/0408645 A1 Dec. 21, 2023

(51) Int. Cl.
*G01S 13/78* (2006.01)
*G01S 7/02* (2006.01)
*G01S 7/03* (2006.01)
*G01S 7/40* (2006.01)
*G01S 13/931* (2020.01)

(52) U.S. Cl.
CPC ............ *G01S 7/4021* (2013.01); *G01S 7/027* (2021.05); *G01S 7/03* (2013.01); *G01S 13/931* (2013.01); *G01S 13/78* (2013.01); *G01S 2013/93274* (2020.01)

(58) Field of Classification Search
CPC ........ G01S 13/78; G01S 13/87; G01S 13/931; G01S 2013/93271; G01S 2013/93274; G01S 7/027; G01S 7/03; G01S 7/4021; G01S 7/4026; G01S 7/4082
See application file for complete search history.

(56) References Cited

U.S. PATENT DOCUMENTS

| 2019/0120951 A1* | 4/2019 | Fischer | ................. B60W 30/08 |
| 2020/0309932 A1 | 10/2020 | Zeng et al. | |
| 2021/0195112 A1* | 6/2021 | Verghese | ................ G01S 17/89 |

FOREIGN PATENT DOCUMENTS

DE 102020130829 A1 7/2021

* cited by examiner

*Primary Examiner* — Timothy A Brainard
(74) *Attorney, Agent, or Firm* — Lorenz & Kopf LLP

(57) ABSTRACT

A radar system includes a radio frequency (RF) section that is controllable to focus operation in one of a plurality of fields of view (FOVs) and a control section configured to identify a side of the vehicle in which the radar system is installed and direct the RF section to focus transmission and reception in one of a first or a second FOV based on the side of the side of the vehicle in which the radar system is installed. A method includes: transmitting RF energy and listening for a reflection from a predetermined target mounted on one side of a vehicle; determining a whether a reflection has been detected; and directing the RF section to focus operations to the FOV that is predetermined for use for a radar system mounted on a same side of the vehicle as the predetermined target when a reflection has been detected.

20 Claims, 5 Drawing Sheets

MODULAR RADAR SYSTEMS

INTRODUCTION

The technical field generally relates to modular radar systems and more particularly relates to calibration of modular radar systems.

Automotive radar is being deployed to make driving safer and more automated. Automotive radar can be used for Adaptive Cruise Control (ACC), Autonomous Emergency Braking (AEB), Intelligent Parking System (IPS), Blind Spot Detection (BSD), Collision Mitigation System (CMS) and other automated systems.

Many automotive radar providers provide radar systems that can be adapted for use in multiple vehicle locations. The radar systems can operate in a wide coverage area. Radar operation can be improved if a radar system can focus on a narrower range of radar coverage versus a wider range.

It is therefore desirable for improved methods, systems, and apparatuses for focusing radar operation. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are vehicle methods and systems. In various embodiments, a modular radar system for use in an automotive vehicle is provided. The modular radar system includes: a radio frequency (RF) section configured to transmit and receive RF signals and includes an antenna array and an RF transceiver that are controllable to focus operation in one of a plurality of fields of view (FOVs), including a first FOV and a second FOV. The modular radar system further includes a control section including a controller for performing signal processing operations on return RF signals received at the RF receiver. The controller is configured to identify a side of the vehicle at which the modular radar system is installed and direct the RF section to focus transmission and reception in one of the first FOV or the second FOV based on the side of the side of the vehicle in which the modular radar system is installed. The controller is configured to determine a side of the vehicle in which the modular radar system is installed through calibration operations, wherein the modular radar system transmits RF energy and listens for a reflection from a predetermined target mounted on one side of the vehicle, and the modular radar system determines whether a reflection from the predetermined target has been detected. The controller is further configured to direct the RF section to focus operations to the FOV that is predetermined to be used for a modular radar module that is mounted on a same side of the vehicle as the predetermined target when a reflection has been detected; and direct the RF section to focus operations to the FOV that is predetermined to be used for a modular radar system that is not mounted on the same side of the vehicle as the predetermined target when a reflection has not been detected.

In various embodiments, the modular radar system further includes a first calibration table for use when the modular radar system is focused for operation in the first FOV and a second calibration table for use when the modular radar system is focused for operation in the second FOV.

In various embodiments, the modular radar system loads the first calibration table for use during signal processing when a reflection has been detected during calibration operations and the RF section is directed to focus operations to the first FOV, and loads the second calibration table for use during signal processing when a reflection has not been detected during calibration operations and the RF section is directed to focus operations to the second FOV.

In various embodiments of the modular radar system, the predetermined target is an external target that is external to the vehicle.

In various embodiments of the modular radar system, the predetermined target is an internal target that is internal to the vehicle.

In various embodiments of the modular radar system, to direct the RF section to focus transmission and reception in one of a plurality of possible FOVs, the controller is configured to direct the RF section to direct power resources to portions of the antenna array, power amplifier, or transceiver that transmit or receive RF signals in a selected FOV.

In various embodiments of the modular radar system, the controller is configured to determine a side of the vehicle in which the modular radar system is installed through calibration operations at factory installation of the modular radar system in the vehicle.

In various embodiments of the modular radar system, the controller is configured to determine a side of the vehicle in which the modular radar system is installed through calibration operations at a repair facility when a modular radar system is installed in the vehicle.

In various embodiments, an automotive vehicle is disclosed. The automotive vehicle includes a plurality of modular radar systems including a first modular radar system and a second modular radar system, wherein the first modular radar system is installed on a first side of the vehicle and the second modular radar system is installed on a second side of the vehicle. Each of the first and second modular radar systems includes a radio frequency (RF) section configured to transmit and receive RF signals and includes an antenna array and an RF transceiver that are controllable to focus operation in one of a plurality of fields of view (FOVs), including a first FOV and a second FOV. Each of the first and second modular radar systems further includes a control section including a controller for performing signal processing operations on return RF signals received at the RF receiver. The controller is configured to identify a side of the vehicle in which the modular radar system is installed and direct the RF section to focus transmission and reception in one of the first FOV or the second FOV based on the side of the side of the vehicle in which the modular radar system is installed. The controller is configured to determine a side of the vehicle in which the modular radar system is installed through calibration operations, wherein the modular radar system transmits RF energy and listens for a reflection from a predetermined target mounted on one side of the vehicle, and the modular radar system determines whether a reflection from the predetermined target has been detected. The controller is further configured to direct the RF section to focus operations to the FOV that is predetermined to be used for a modular radar module that is mounted on a same side of the vehicle as the predetermined target when a reflection has been detected and direct the RF section to focus operations to the FOV that is predetermined to be used for a modular radar system that is not mounted on the same side of the vehicle as the predetermined target when a reflection has not been detected.

In various embodiments of the automotive vehicle, each of the first and second modular radar systems further includes a first calibration table for use when the modular radar system is focused for operation in the first FOV and a second calibration table for use when the modular radar system is focused for operation in the second FOV.

In various embodiments of the automotive vehicle, the first modular radar system loads the first calibration table for use during signal processing because a reflection has been detected during calibration operations and the RF section in the first modular radar system is directed to focus operations to the first FOV, and the second modular radar system loads the second calibration table for use during signal processing because a reflection has not been detected during calibration operations and the RF section in the second modular radar system is directed to focus operations to the second FOV.

In various embodiments of the automotive vehicle, the predetermined target is an external target that is external to the vehicle.

In various embodiments of the automotive vehicle, the predetermined target is an internal target that is internal to the vehicle.

In various embodiments of the automotive vehicle, to direct the RF section to focus transmission and reception in one of a plurality of possible FOVs, the controller in each of the first and second modular radar systems is configured to direct the RF section to direct power resources to portions of the antenna array, power amplifier, or transceiver that transmit or receive RF signals in a selected FOV.

In various embodiments of the automotive vehicle, the controller in each of the first and second modular radar systems is configured to determine a side of the vehicle at which the modular radar system is installed through calibration operations at factory installation of the modular radar system in the vehicle.

In various embodiments of the automotive vehicle, the controller in each of the first and second modular radar systems is configured to determine a side of the vehicle in which the modular radar system is installed through calibration operations at a repair facility when a modular radar system is installed in the vehicle.

In various embodiments, a method in a modular radar system for use in an automotive vehicle is provided. The modular radar system includes a radio frequency (RF) section configured to transmit and receive RF signals and includes an antenna array and an RF transceiver that are controllable to focus operation in one of a plurality of fields of view (FOVs), including a first FOV and a second FOV. The modular radar system further includes a control section configured to identify a side of the vehicle in which the modular radar system is installed and direct the RF section to focus transmission and reception in one of the first FOV or the second FOV based on the side of the side of the vehicle in which the modular radar system is installed. The method includes: transmitting RF energy and listening for a reflection of the RF energy from a predetermined target mounted on one side of the vehicle; determining a whether a reflection from the predetermined target has been detected; directing the RF section to focus operations to the FOV that is predetermined to be used for a modular radar system that is mounted on a same side of the vehicle as the predetermined target when a reflection has been detected; and directing the RF section to focus operations to the FOV that is predetermined to be used for a modular radar system that is not mounted on the same side of the vehicle as the predetermined target when a reflection has not been detected.

In various embodiments, the method further includes providing a first calibration table for use when the modular radar system is focused for operation in the first FOV and a second calibration table for use when the modular radar system is focused for operation in the second FOV.

In various embodiments, the method further includes: loading the first calibration table for use during signal processing when a reflection has been detected during calibration operations and the RF section is directed to focus operations to the first FOV; and loading the second calibration table for use during signal processing when a reflection has not been detected during calibration operations and the RF section is directed to focus operations to the second FOV.

In various embodiments of the method, directing the RF section to focus operations to the FOV includes directing the RF section to direct power resources to portions of the antenna array, power amplifier, or transceiver that transmit or receive RF signals in the FOV.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
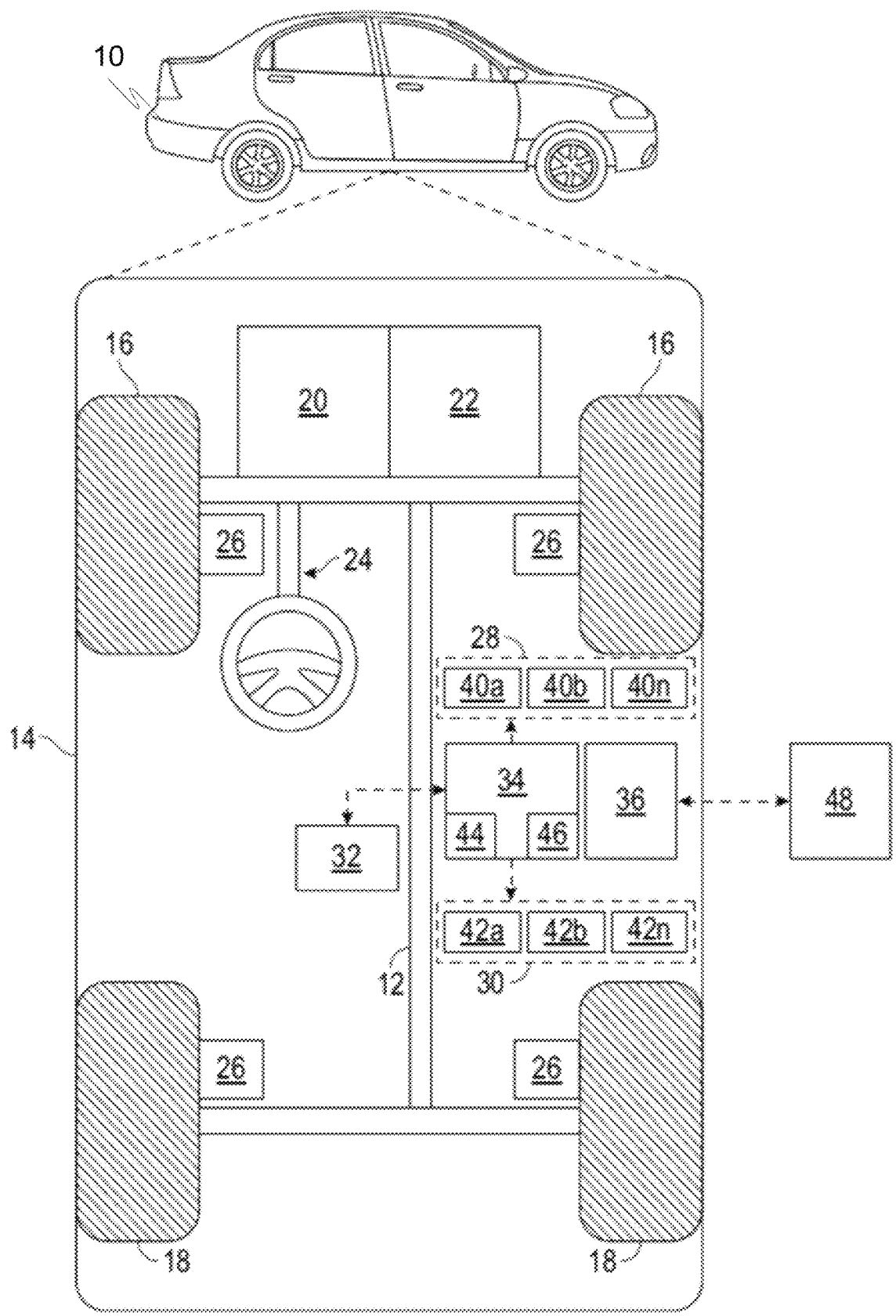
FIG. 1 is a block diagram depicting an example vehicle, in accordance with an embodiment.

FIG. 1 is a block diagram depicting an example vehicle 10. As depicted in FIG. 1, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 may be capable of being driven manually, autonomously and/or semi-autonomously.

The vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40r that sense observable conditions of the exterior environment and/or the interior environment of the vehicle 10. The sensing devices 40a-40r can include but are not limited to, radars, lidars, global positioning systems, optical cameras, thermal cameras, ultrasonic sensors (e.g., 40o-40r), inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, and the brake system 26.

Radar deployed via sensing devices 40a-40r is deployed to make driving safer and more automated. Automotive radar can be used for many automated features such as Adaptive Cruise Control (ACC), Autonomous Emergency Braking (AEB), Intelligent Parking System (IPS), Blind Spot Detection (BSD), Collision Mitigation System (CMS) and others.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34. The programming instructions may include one or more separate programs, each of which comprises an ordered listing of executable instructions for implementing logical functions.

Radar sensors (e.g., implemented via sensing devices 40a-40r) for acquisition of the exterior environment of the vehicle 10 can enable semi-autonomous and fully autonomous driving features. Many radar sensors are provided as modular radar systems that are capable of operation in multiple fields of view (FOV) to allow the modular radar system to be mounted at multiple locations on a vehicle (e.g., front left or front right, rear left or rear right, left side or right side). A specific FOV may be chosen for use based on the mounting location of the modular radar system on a vehicle. Because many autonomous driving features require radar sensors to reliably detect objects, it can be important for a modular radar system that is capable of being mounted at multiple vehicle locations to be calibrated for the specific FOV that is used, which is determined based on the location at which the modular radar system is ultimately mounted. Thus, at installation on a vehicle, for example in a factory at vehicle assembly or in a repair facility when a modular radar system is replaced, the modular radar system undergoes a mounting location-based calibration.

Figure 2:
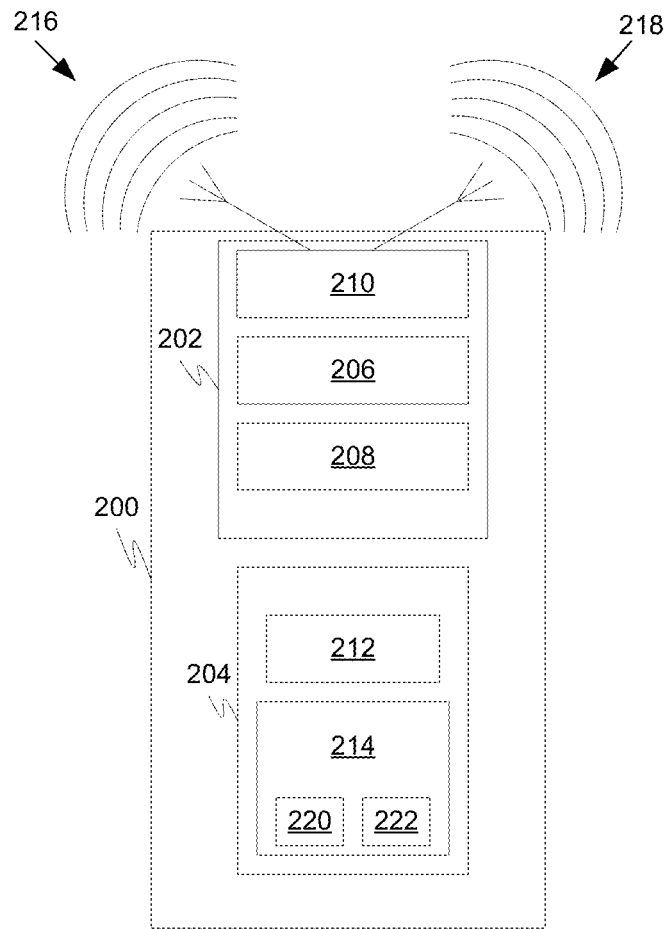
FIG. 2 is a block diagram depicting an example modular radar system that may be installed in a vehicle, in accordance with an embodiment.

FIG. 2 is a block diagram depicting an example modular radar system 200 that may be installed in a vehicle 10. The example modular radar system 200 employs a frequency modulated continuous wave (FMCW) radar approach although other radar approaches such as orthogonal frequency-division multiplexing (OFDM) and random radar may be employed. The example modular radar system 200 comprises a radio frequency (RF) section 202 and a control section 204.

The example RF section 202 includes an RF transmitter and an RF receiver (collectively referred to herein as an RF transceiver 206), a power amplifier 208, and an antenna array 210 for transmitting RF signals provide by the RF transmitter and receiving RF return signals that have been reflected by one or more targets for processing by the RF receiver.

The example RF transceiver 206 (which in this example is a FMCW transceiver) exploits small shifts in signal frequency by transmitting a signal that varies in frequency over a fixed period of time. This provides a measurement of speed and distance. The example FMCW transceiver sends out a chirp, a pulse whose frequency rises during its transmission, which is amplified by the power amplifier 208 and transmitted in a plurality of directions from the antenna array 210. The example FMCW transceiver also senses reflected radiation patterns and determine differences between the transmitted and received RF signals. The instantaneous difference between the frequency of the chirp coming out of the transmitter and the frequency of a received reflection (at any one time) is directly proportional to a time delay, and the time delay is directly proportional to the range from the transmitter to the object.

The control section 204 includes a controller 212 for performing signal processing operations on the return RF signals received at the RF receiver. The signal processing operations include analyzing signals received from the receiver to identify one or more targets and determining a range measurement, relative velocity, and angular position for each of the one or more identified targets. The controller 212 comprises one or more processors, non-transitory computer readable media, and programming instructions encoded in the non-transitory computer readable media for configuring the one or more processors to perform signal processing operations, among other things.

The controller 212 is also configured to direct the RF section 202 to focus transmission and reception in one of a plurality of possible FOVs, including a first FOV 216 or a second FOV 218. Directing the RF section 202 to focus transmission and reception may include directing the RF section 202 to direct power resources to portions of the antenna array 210, power amplifier 208, and/or transceiver 206 that transmit and receive RF signals in a selected FOV.

The control section 204 also includes a plurality of calibration tables 214, including a first calibration table 220 and a second calibration table 222. The first calibration table 220 corresponds to the first FOV 216 and the second calibration table 222 corresponds to the second FOV 218. The controller 212 is configured to select a calibration table containing values for use during signal processing operations based on the FOV to which the RF section has been directed to focus transmission and reception.

Figure 3:
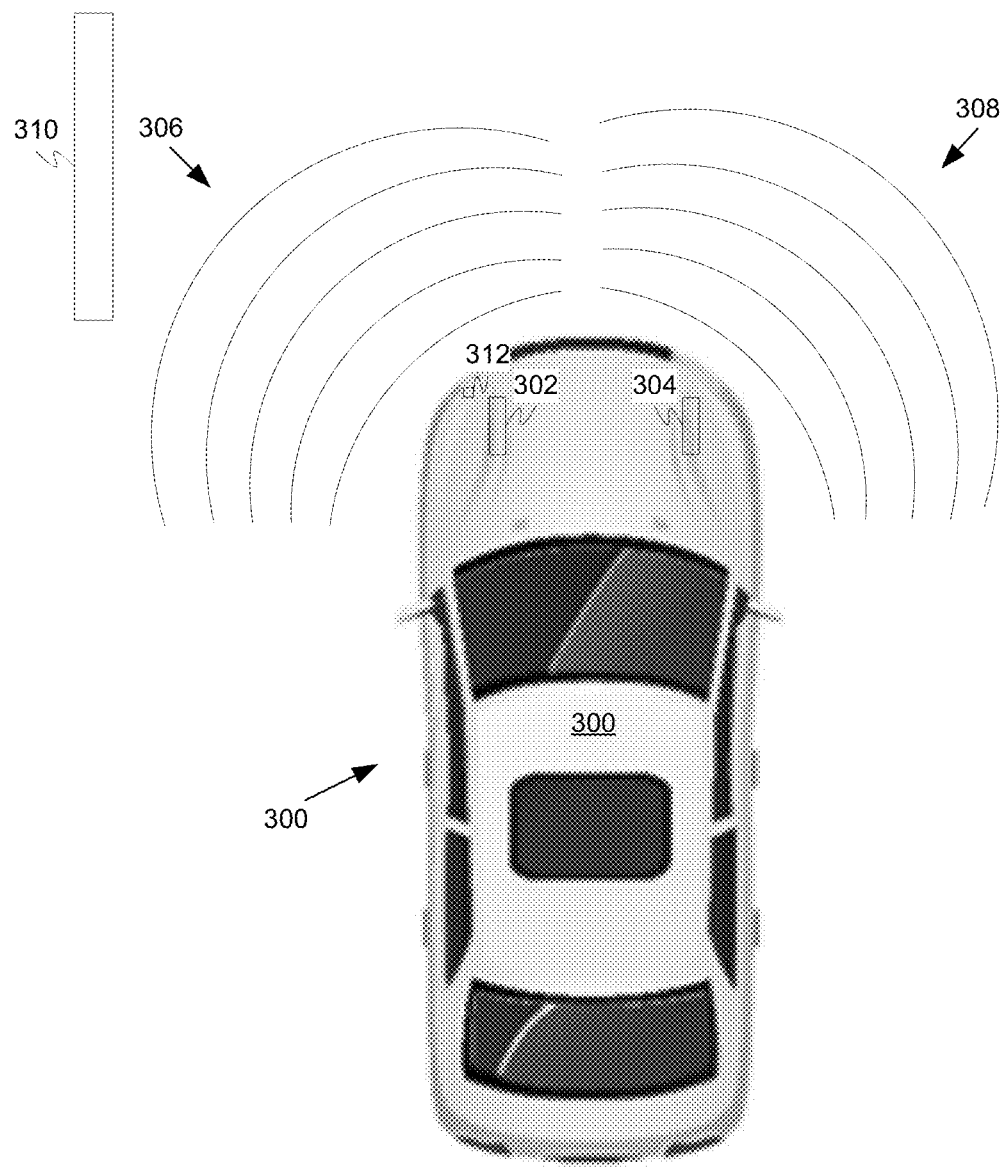
FIG. 3 is a block diagram depicting an example vehicle with a first modular radar system installed on a first (e.g., left front) side of the vehicle and a second modular radar system installed on a second or opposite (e.g., right right) side of the vehicle, in accordance with an embodiment.

FIG. 3 is a block diagram depicting an example vehicle 300 with a first modular radar system 302 installed on a first (e.g., left front) side of the vehicle 300 and a second modular radar system 304 installed on a second or opposite (e.g., right right) side of the vehicle 300. Each of the first modular radar system 302 and the second modular radar system 304 has a calibration mode of operation that allows the modular radar system to determine the side of the vehicle 300 on which the modular radar system is mounted. The mounting side determines the direction of focus for the RF section and which of the calibration tables to use.

In this example, the first modular radar system 302 during a calibration operating mode detects that it is mounted on the first (left front) side of the vehicle 300 and the second modular radar system 304 detects that it is mounted on the second (right front) side of the vehicle 300. Based on the detection, the first modular radar system 302 focuses its RF section to a first FOV 306 and loads a first calibration table (e.g., 220) for use during signal processing operations, and the second modular radar system 304 focuses its RF section to a second FOV 308 and loads a second calibration table (e.g., 222) for use during signal processing operations.

The modular radar system sensing reflected signals from a predetermined target to identify mounting location has advantages over other potential ways of determining mounting location. As an example, a method wherein a signal is provided to the modular radar system via a dedicated wire from the automotive vehicle has the disadvantage of requiring an additional wire to be provided by the vehicle to the modular radar system. Assembly costs and assembly time reduction can be attained by using the methods described herein as opposed to providing a signal on an additional wire from the vehicle to the modular radar system.

Figure 4:
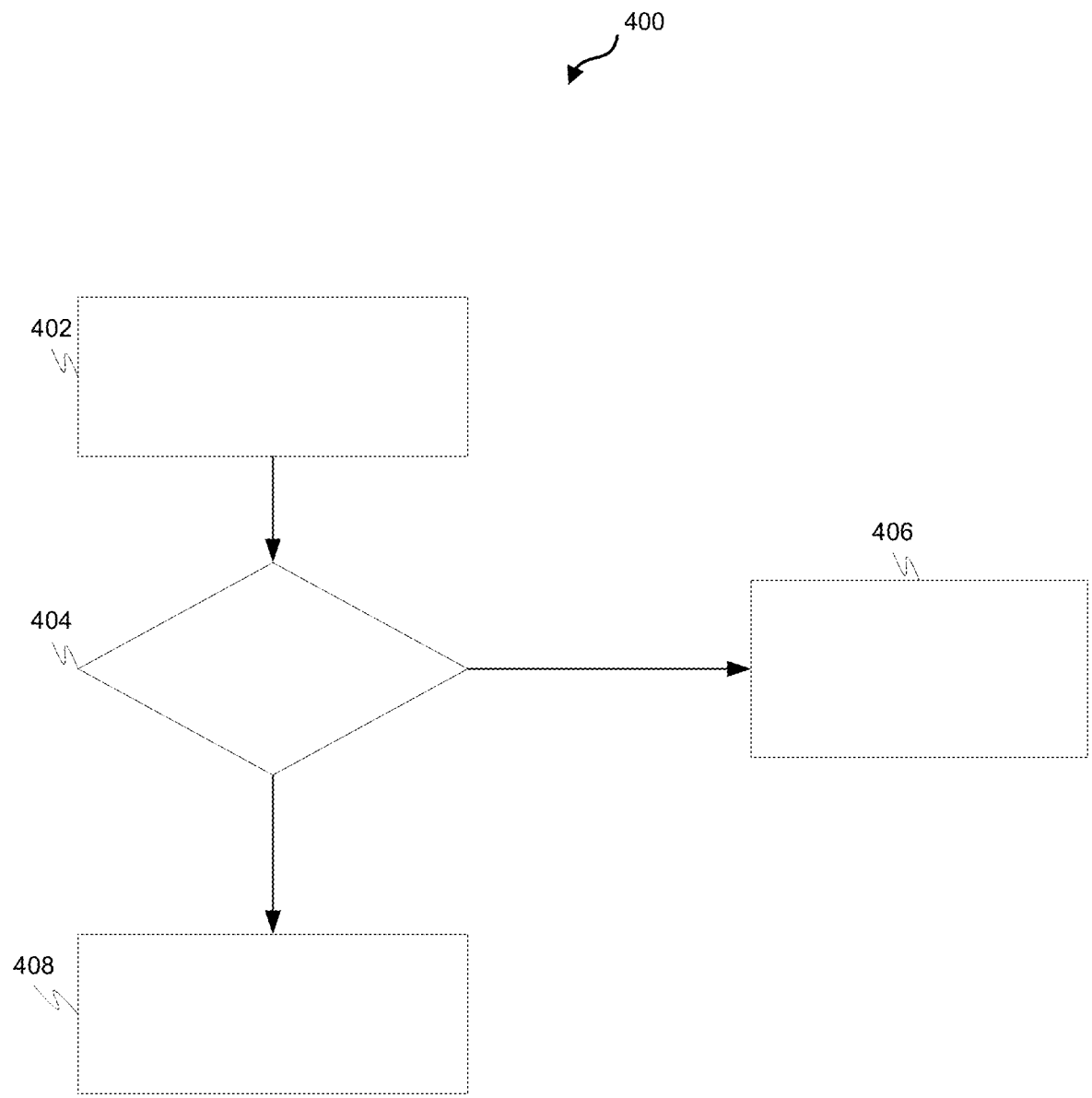
FIG. 4 is a process flow chart depicting an example process in a modular radar system during a calibration mode for detecting a vehicle mounting location, in accordance with an embodiment.

FIG. 4 is a process flow chart depicting an example process 400 in a modular radar system during a calibration operating mode for detecting a vehicle mounting location. Process 400 is described with reference to FIG. 3. The order of operation within process 400 is not limited to the sequential execution as illustrated in the FIG. 4 but may be performed in one or more varying orders as applicable and in accordance with the present disclosure.

At operation 402, a modular radar system (e.g., modular radar system 302 and/or 304) transmits RF energy and listens for a reflection from a predetermined target. The predetermined target may be an external target 310 (e.g., a portable RF reflecting object), which is positioned outside of the vehicle 300 at a predetermined location, or an internal target 312 (e.g., a small coin-sized RF reflecting object), which is positioned on one side of the vehicle at a predetermined location (e.g., inside of a bumper).

At decision 404, the modular radar system (e.g., 302 and/or 304) determines whether a reflection from the predetermined target has been detected. When a reflection has been detected (yes at decision 404), the modular radar system, at operation 406, loads the calibration table that corresponds to the FOV that is to be used for a modular radar system that is mounted on the same side of the vehicle as the predetermined target. When a reflection has not been detected (no at decision 404), the modular radar system, at operation 408, loads the calibration table that corresponds to the FOV that is to be used for a modular radar system that is not mounted on the same side of the vehicle as the predetermined target.

Figure 5:
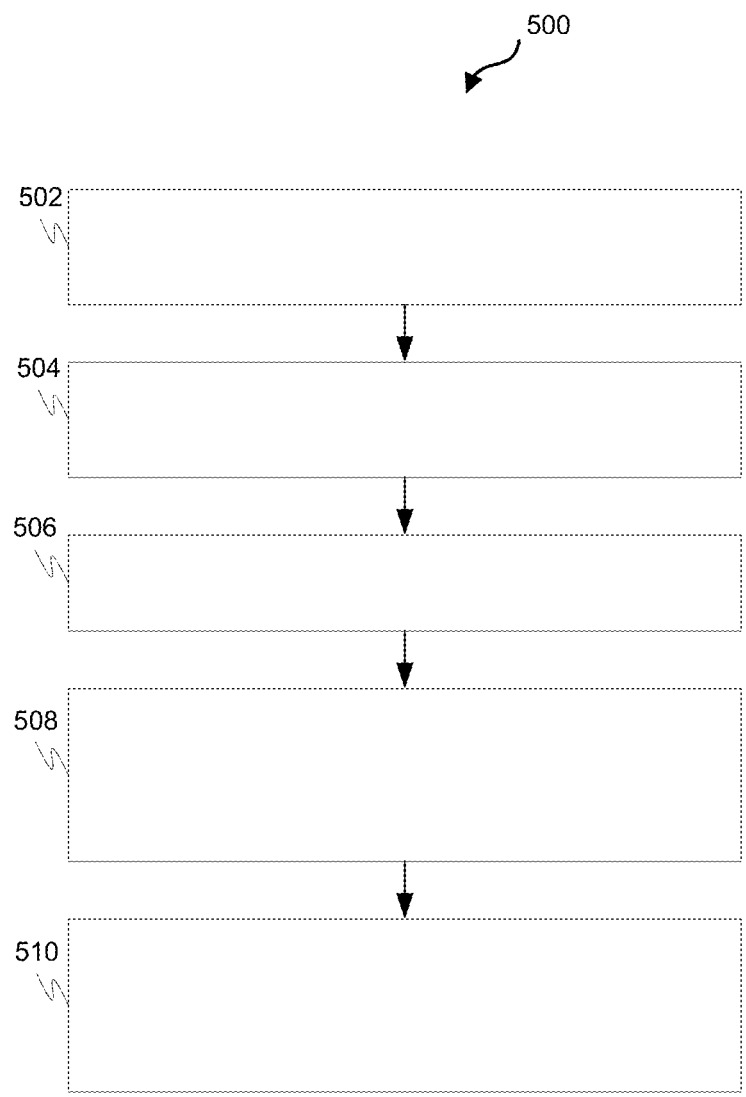
FIG. 5 is a process flow chart depicting an example process for use in an automotive vehicle, in accordance with an embodiment.

FIG. 5 is a process flow chart depicting an example process 500 for use in an automotive vehicle. The modular radar system includes a radio frequency (RF) section configured to transmit and receive RF signals and includes an antenna array and an RF transceiver that are controllable to focus operation in one of a plurality of fields of view (FOVs), including a first FOV and a second FOV. The modular radar system further includes a control section configured to identify a side of the vehicle in which the modular radar system is installed and direct the RF section to focus transmission and reception in one of the first FOV or the second FOV based on the side of the side of the vehicle in which the modular radar system is installed. The order of operation within process 500 is not limited to the sequential execution as illustrated in the FIG. 5 but may be performed in one or more varying orders as applicable and in accordance with the present disclosure.

The example process 500 includes transmitting RF energy (operation 502) and listening for a reflection of the RF energy from a predetermined target mounted on one side of the vehicle (operation 504). The reflection is sensed when the target is located on the side of the vehicle in which the modular radar system is installed.

At operation 506, the example process 500 includes determining whether a reflection from a predetermined target has been detected. When a reflection from the predetermined target is detected in the reflected RF energy returns, the modular radar system identifies the modular radar system as being installed on the side of the vehicle in which the target is located. When the reflection from the predetermined target is not detected in the reflected RF energy returns, the modular radar system identifies the modular radar system as not being installed on the side of the vehicle in which the target is located.

The modular radar system may have a first calibration table for use when the modular radar system is focused for operation in the first FOV and a second calibration table for use when the modular radar system is focused for operation in the second FOV.

At operation 508, the example process 500 includes directing the RF section to focus operations to the FOV that is predetermined to be used for a modular radar system that is mounted on the same side of the vehicle as the predetermined target when a reflection has been detected. Directing the RF section to focus operations to the FOV may include directing the RF section to direct power resources to portions of the antenna array, power amplifier, or transceiver that transmit or receive RF signals in the FOV. In one example implementation, the process 500 includes loading the first calibration table for use during signal processing when a reflection has been detected during calibration operations and the RF section is directed to focus operations to the first FOV.

At operation 510, the example process 500 includes directing the RF section to focus operations to the FOV that is predetermined to be used for a modular radar system that is not mounted on the same side of the vehicle as the predetermined target when a reflection has not been detected. Directing the RF section to focus operations to the FOV may include directing the RF section to direct power resources to portions of the antenna array, power amplifier, or transceiver that transmit or receive RF signals in the FOV. In one example implementation, the process 500 includes loading the second calibration table for use during signal processing when a reflection has not been detected during calibration operations and the RF section is directed to focus operations to the second FOV.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A modular radar system for use in an automotive vehicle, comprising:
a radio frequency (RF) section configured to transmit and receive RF signals and comprising an antenna array and an RF transceiver that are controllable to focus operation in one of a plurality of fields of view (FOVs), including a first FOV and a second FOV; and
a control section comprising a controller for performing signal processing operations on return RF signals received at the RF receiver, the controller configured to identify a side of the vehicle in which the modular radar system is installed and direct the RF section to focus transmission and reception in one of the first FOV or the second FOV based on the side of the side of the vehicle in which the modular radar system is installed; wherein the controller is configured to:
determine a side of the vehicle in which the modular radar system is installed through calibration operations, wherein the modular radar system transmits RF energy and listens for a reflection from a predetermined target mounted on one side of the vehicle, and the modular radar system determines whether a reflection from the predetermined target has been detected;
direct the RF section to focus operations to the FOV that is predetermined to be used for a modular radar module that is mounted on a same side of the vehicle as the predetermined target when a reflection has been detected; and
direct the RF section to focus operations to the FOV that is predetermined to be used for a modular radar system that is not mounted on the same side of the vehicle as the predetermined target when a reflection has not been detected.

2. The modular radar system of claim 1, further comprising a first calibration table for use when the modular radar system is focused for operation in the first FOV and a second calibration table for use when the modular radar system is focused for operation in the second FOV.

3. The modular radar system of claim 2, wherein the modular radar system loads the first calibration table for use during signal processing when a reflection has been detected during calibration operations and the RF section is directed to focus operations to the first FOV, and wherein the modular radar system loads the second calibration table for use during signal processing when a reflection has not been detected during calibration operations and the RF section is directed to focus operations to the second FOV.

4. The modular radar system of claim 1, wherein the predetermined target is an external target that is external to the vehicle.

5. The modular radar system of claim 1, wherein the predetermined target is an internal target that is internal to the vehicle.

6. The modular radar system of claim 1, wherein to direct the RF section to focus transmission and reception in one of a plurality of possible FOVs, the controller is configured to direct the RF section to direct power resources to portions of the antenna array, power amplifier, or transceiver that transmit or receive RF signals in a selected FOV.

7. The modular radar system of claim 1, wherein the controller is configured to determine a side of the vehicle in which the modular radar system is installed through calibration operations at factory installation of the modular radar system in the vehicle.

8. The modular radar system of claim 1, wherein the controller is configured to determine a side of the vehicle in which the modular radar system is installed through calibration operations at a repair facility when a modular radar system is installed in the vehicle.

9. An automotive vehicle comprising:
a plurality of modular radar systems including a first modular radar system and a second modular radar system, the first modular radar system installed on a first side of the vehicle and the second modular radar system installed on a second side of the vehicle; and each of the first and second modular radar systems, comprising:
    a radio frequency (RF) section configured to transmit and receive RF signals and comprising an antenna array and an RF transceiver that are controllable to focus operation in one of a plurality of fields of view (FOVs), including a first FOV and a second FOV; and
    a control section comprising a controller for performing signal processing operations on return RF signals received at the RF receiver, the controller configured to identify a side of the vehicle in which the modular radar system is installed and direct the RF section to focus transmission and reception in one of the first FOV or the second FOV based on the side of the side of the vehicle in which the modular radar system is installed;
    wherein the controller is configured to:
        determine a side of the vehicle in which the modular radar system is installed through calibration operations, wherein the modular radar system transmits RF energy and listens for a reflection from a predetermined target mounted on one side of the vehicle, and the modular radar system determines whether a reflection from the predetermined target has been detected;
        direct the RF section to focus operations to the FOV that is predetermined to be used for a modular radar module that is mounted on a same side of the vehicle as the predetermined target when a reflection has been detected; and
        direct the RF section to focus operations to the FOV that is predetermined to be used for a modular radar system that is not mounted on the same side of the vehicle as the predetermined target when a reflection has not been detected.

10. The automotive vehicle of claim 9, wherein each of the first and second modular radar systems further comprises a first calibration table for use when the modular radar system is focused for operation in the first FOV and a second calibration table for use when the modular radar system is focused for operation in the second FOV.

11. The automotive vehicle of claim 10, wherein the first modular radar system loads the first calibration table for use during signal processing because a reflection has been detected during calibration operations and the RF section in the first modular radar system is directed to focus operations to the first FOV, and the second modular radar system loads the second calibration table for use during signal processing because a reflection has not been detected during calibration operations and the RF section in the second modular radar system is directed to focus operations to the second FOV.

12. The automotive vehicle of claim 9, wherein the predetermined target is an external target that is external to the vehicle.

13. The automotive vehicle of claim 9, wherein the predetermined target is an internal target that is internal to the vehicle.

14. The automotive vehicle of claim 9, wherein to direct the RF section to focus transmission and reception in one of a plurality of possible FOVs, the controller in each of the first and second modular radar systems is configured to direct the RF section to direct power resources to portions of the antenna array, power amplifier, or transceiver that transmit or receive RF signals in a selected FOV.

15. The automotive vehicle of claim 9, wherein the controller in each of the first and second modular radar systems is configured to determine a side of the vehicle in which the modular radar system is installed through calibration operations at factory installation of the modular radar system in the vehicle.

16. The automotive vehicle of claim 9, wherein the controller in each of the first and second modular radar systems is configured to determine a side of the vehicle in which the modular radar system is installed through calibration operations at a repair facility when a modular radar system is installed in the vehicle.

17. A method in a modular radar system for use in an automotive vehicle, the modular radar system comprising a radio frequency (RF) section configured to transmit and receive RF signals and comprising an antenna array and an RF transceiver that are controllable to focus operation in one of a plurality of fields of view (FOVs), including a first FOV and a second FOV, and a control section configured to identify a side of the vehicle in which the modular radar system is installed and direct the RF section to focus transmission and reception in one of the first FOV or the second FOV based on the side of the side of the vehicle in which the modular radar system is installed, the method comprising:
    transmitting RF energy and listening for a reflection of the RF energy from a predetermined target mounted on one side of the vehicle;
    determining that a reflection from the predetermined target has not been detected; and
    directing the RF section to focus operations to the FOV that is predetermined to be used for a modular radar system that is not mounted on the same side of the vehicle as the predetermined target.

18. The method of claim 17, further comprising providing a first calibration table for use when the modular radar system is focused for operation in the first FOV and a second calibration table for use when the modular radar system is focused for operation in the second FOV.

19. The method of claim 18, further comprising:
    loading the first calibration table for use during signal processing when the RF section is directed to focus operations to the first FOV; and
    loading the second calibration table for use during signal processing when the RF section is directed to focus operations to the second FOV.

20. The method of claim 17, wherein directing the RF section to focus operations to the FOV comprises directing the RF section to direct power resources to portions of the antenna array, power amplifier, or transceiver that transmit or receive RF signals in the FOV.

* * * * *